DYNAMIC STORAGE ANALOG COMPUTER

Filed March 31, 1961 2 Sheets-Sheet 1

Jack M. Andrews
INVENTOR.

BY William R. Sherman

ATTORNEY

Jan. 25, 1966 J. M. ANDREWS 3,231,724

DYNAMIC STORAGE ANALOG COMPUTER

Filed March 31, 1961 2 Sheets-Sheet 2

Jack M. Andrews
INVENTOR.

BY William K. Sherman

ATTORNEY 3,231,724

DYNAMIC STORAGE ANALOG COMPUTER

Jack M. Andrews, Highland Park, N.J., assignor to Computer Systems, Inc., Monmouth Junction, N.J., a corporation of New York Filed Mar. 31, 1961, Ser. No. 99,783
9 Claims. (Cl. 235—150.51)

This invention relates to analog computers and more particularly to analog computers employing operational amplifiers in association with storage capacitors for memory or like purposes.

In analog computers, such functions as signal integration and setting in of initial values are commonly performed by computing or operational integrator amplifiers. For such purposes, the integrator amplifier typically includes a high-gain, direct coupled (D.C.) amplifier of single-ended, phase-inverting type. Either by fixed or patch bay connections, a degenerative feedback loop is provided between the output and input terminals of the amplifier, comprising an integrating capacitor. By a similar choice of connections, one or more input resistors have a common junction for applying the sum of a corresponding one or more input signals to the input terminal of the amplifier.

In order that integration of such input signals may be started from an initial value, a relay is arranged to switch the amplifier input from the common junction of such input resistors to the common junction of a feedback resistor and a like-valued initial condition (i.c.) input resistor. The amplifier then responds to the sum of its output voltage and a voltage $E_{i.c.}$ representing the initial value applied to the initial condition input resistor. Because of the high gain inverting action of an operational amplifier, its output is driven into (negative) correspondence with the initial condition voltage $E_{i.c.}$ in the time required for resetting the charge of the capacitor. When the relay couples the regular input signal or signals to the amplifier thereafter, the integration of these signals proceeds from such initial condition value.

In practice, the resetting time for the typical integrator amplifier is so long that use of this technique was generally limited to the beginning of a computing operation. Also, use of initial condition inputs was typically restricted to constant or, at best, slowly varying values, because the long resetting time produced a lag in the correspondence or tracking of the output signal with respect to the initial condition input.

For more versatile application of analog computers, however, it is highly desirable that the resetting capabilities of operational amplifiers arranged as memory units be extended to use in a cyclic or repetitive mode of computer operation, where the repetition rate may range, say from about 50 to 1000 c.p.s. and higher.

At the same time, a portion of the problem set up on the computer may be operated in real time, expanded time, or at a repetition rate typically lower than the foregoing repetition rate. During recurrent cycles in repetitive operation, provision is desirably made for changing from tracking to storing or from storing to tracking at a problem-determined time, such time preferably occurring only within one interval of each cycle. The problem-determined time may, for example, occur when a variable input reaches a limit for which evaluation of the integral with respect to such variable is desired. In another application, evaluation of a double integral with respect to one variable may proceed in such a manner in each cycle, and be repeated cycle-by-cycle for successive values of an independent variable.

Accordingly, it is an object of the present invention to provide new and improved analog computers arranged for dynamic storage of values.

Another object of the present invention is to provide new and improved analog computers arranged for storage during recurrent intervals of values obtained at an instant during respective preceding intervals.

A further object of the present invention is to provide new and improved analog computers wherein values may be required, stored and shifted between successive operational amplifiers during recurrent intervals to perform a variety of computing functions.

Yet another object of the present invention is to provide new and improved analog computers wherein the storage of values may be initiated or terminated at a problem-determined time in successive cycles of operation, each of which includes intervals for acquisition and storage of values.

Still a further object of the present invention is to provide such analog computers wherein the problem-determined time is dependent upon boundary values associated with an integration.

These and other objects are attained by providing an analog computer with a plurality of operational amplifiers arranged for cascaded connection and each capable of reproducing an input signal and capacitively storing the value thereof during successive intervals. Control means are provided for determining the instant when the input signal has its value stored at the amplifier output. By programming the acquisition and storage of values by successive amplifiers in timed relation (e.g., phase opposition or alternation) the value stored by an amplifier in one interval may correspond with the value stored in a preceding amplifier during a preceding interval, while the preceding amplifier acquires a new value. Provision is made for speedy resetting of the amplifiers so that such intervals may be short, as for purposes of a high rate of periodic repetition.

According to the invention, means for programming the acquisition and storage of values includes a voltage comparator having at least one input signal which varies during recurrent intervals and is reset to a prescribed value during alternate intervals. For example, such input signal may vary linearly across the full range of voltages to which the comparator is responsive, once each recurrent interval, and be reset in the alternate intervals to the initial extremity of the range. Hence, in each recurrent interval, the comparator provides a control signal to the control means at the instant when a comparison is obtained between the inputs to the comparator. At such instant, the amplifier input signal is stored at its output. Alternatively for such amplifier or a succeeding amplifier, the stored value may be released at such instant and the output then tracks the amplifier input signal.

Such analog computer may be used for evaluating definite integrals and for double integration.

The invention, together with others of its objects and advantages, will be better understood from the following detailed description taken in conjunction with the drawings in which.

Figures 1, 2:
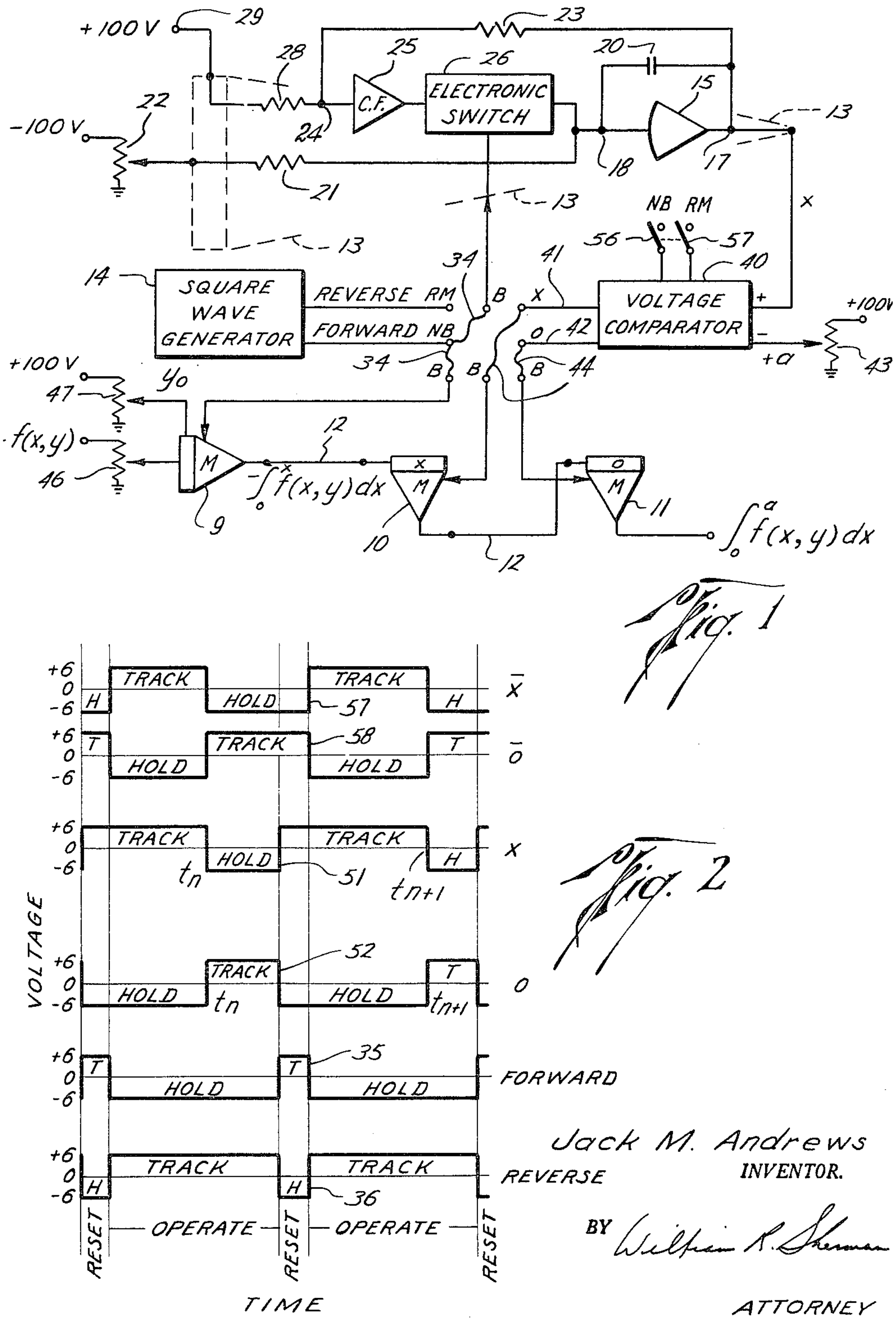
FIG. 1 is a schematic diagram of an analog computing system in accordance with the invention.
FIG. 2 is a graphical representation of the variation of voltages occurring in the system of FIG. 1.

In FIG. 1 there is shown an analog computer comprising a plurality of operational amplifier memory units 9, 10 and 11 which may conveniently be of identical construction to perform similar memory functions. As shown, the memory units are represented by the conventional symbol for an integrator amplifier but with an "M" in the triangular portion of the symbol to designate the memory function. The components of each such unit may be permanently wired in circuit or, as in a typical general purpose analog computer, some or all terminals of their components may be brought out to a patch bay, switchboard or relay contacts for interconnection (as represented by junction dots) to provide memory units of desired configuration. In the same fashion, the operational amplifier memory units 9, 10 and 11 may have either a permanent cascade connection or preferably may be selectively connected in cascade by a patch bay jumper 12 or the like.

An exemplary form of such memory units is illustrated by the operational amplifier unit 13 which is here employed as an integrator adapted for repetitive or iterative operation.

The analog computer also includes a suitable source of timing waves, such as square wave generator 14, for establishing the cyclic intervals of repetitive or iterative operation. While a single timing wave circuit may be employed, particularly in the embodiments of the invention here illustrated, the exemplary generator 14 is shown to provide outputs designated as "forward" and "reverse" in differently timed relation (e.g., in phase opposition or of opposite polarity). The terminals designated NB (normal bus) and RM (reverse memory) may be provided, for example, on a patch board for effecting selective connections with the forward and reverse busses, respectively, of the timing wave generator 14.

Typically, the general purpose analog computer also includes numbers of additional integrator amplifiers, summing amplifiers, multipliers, function generators, and other arithmetic units, and a variety of resistors, capacitors and potentiometers, as well as regulated voltage sources, mode and control switches, and the like with which a variety of problems can be programmed for repetitive or iterative operation, utilizing the novel arrangements of the present invention.

Each of operational amplifier units 9, 10 and 11 and 13 includes an operational or computing amplifier 15 which generally is of a high-gain, direct coupled (D.C.), drift-free or drift-stabilized, phase-inverting type, preferably characterized by a wide bandwidth and correspondingly fast rise time for handling dynamically varying signals in high speed repetitive operation.

To provide the memory unit with capacitive signal storage, there is preferably connected between output and input terminals 17, 18 of the amplifier 15 an integrating capacitor 20 having a capacitance of, say, 0.01 microfarad for a 100:1 time speed up, as compared with the usual 1 microfarad. To accommodate input signal integration, provision is made for connection of one or more normal input resistors, such as resistor 21, to input terminal 18 of amplifier 15. Typical values for such input resistors are 100 kilohms or one megohm, depending on the value of capacitor 20 and the gain desired, either permitting application of an input voltage continuously without impairing operation of the integrator memory in accordance with the present invention. As shown, operational amplifier unit 13 has connected with its normal input terminal the tap of a potentiometer 22 across which is applied a reference input voltage, for example, −100 volts where the limits of computer voltage excursions is −100 volts to +100 volts. As a matter of convention, an input to the amplifier unit is represented by lead line terminating on the side of the symbol which parallels the base of the triangle, multiple inputs then represented by parallel lead lines extending from this side. As will be described subsequently, such a lead line is associated with memory unit 9. For some iterative programming of problems, voltages may be applied to the input resistor 21 of one or the other of units 10, 11. Typically, however, the normal input resistors may remain unused and unconnected.

The integrating capacitor 20 is thus arranged in a first feedback loop around amplifier 15 for relatively drift-free signal storage. There is further provided a second feedback loop which includes a feedback resistor 23 connected between amplifier output terminal 17 and a summing point 24 in the loop. Such summing point is, for purposes of the present invention, connected to the input terminal 18 for the amplifier via means which provides not only an impedance transformation or stepdown but also a connection which is selectively operative so that the second feedback loop may be alternatively incomplete and completed in an operative sense. Since both of the feedback loops are required to be degenerative, this being true of the first feedback loop by virtue of the inverting action of amplifier 15, the means connected between summing point 24 and input terminal 18 desirably effects zero or an even number of phase reversals.

To exemplify such means, there are shown an impedance transforming amplifier 25 and high speed or electronic switch 26 conveniently coupled in that order between summing point 24 and terminal 18. Amplifier 25, in a preferred form, incorporates a gain stabilized cathode follower or emitter follower providing the desired transformation between a high impedance input and a low impedance output with unity voltage gain, an output impedance of a fraction of an ohm to, say, 50 ohms being exemplary. The connection of output current from this low impedance source is conveniently controlled by utilizing triodes, discharge-type or solid state diodes, transistors or the like in any suitable switching configuration which substantially interrupts current to the amplifier input 18 in the OFF condition and connects such current with minimum drift and attenuation in the ON condition. Of course, the impedance transforming and switching functions may be combined, as in a gated amplifier, or reversed in order, or otherwise provided for in a variety of ways while serving the purposes of the present invention. Also, a mechanical switch or relay may be employed although generally not susceptible to as high speed operation as may be desired.

To couple an input signal into the memory unit 9, 10, 11 or 13, a memory input resistor 28 is provided, connected between input terminal 29 of the memory unit and summing point 24 and having a value preferably equal to or a multiple or submultiple of the resistance value of feedback resistor 23. For example, each may be 100 kilohms. To distinguish from the normal input resistor 21, the memory input resistor 28 is sometimes referred to as the reset or initial condition input resistor. The overall configuration of the computing amplifier 15 with feedback capacitor 20 and resistor 23 and memory input resistor 28 may be recognized as a so-called lag summer modified, however, by the presence of amplifier and switching means 25, 26.

To utilize these means in accordance with the present invention, a timing wave from square wave generator 14 is applied via the forward bus and patch bay terminal NB to the control input patch bay terminal B for the electronic switch 26 of the integrator amplifier unit 13, utilizing patch bay jumper 34. Where the electronic switch is adapted for changing between its OFF and ON conditions by a transition in the timing wave from, say, a negative six volts to a positive six volts, the timing wave may have a form typified by the respective curve 35. For purposes of comparison, the curve 36 is also shown to illustrate a typical wave form on the reverse bus. The particular wave form and amplitude excursions are, of course, properly determined by the requirements for actuating switch 26. In FIG. 2, the timing waves 35, 36 have a square wave form of alternate polarity defining recurrent first and second intervals occurring in alternate sequence during successive cycles. The intervals are designated in connection with curve 35 (forward bus) as a relatively short reset (first) interval and a relatively long operate (second) interval, such designations being adopted by closest analogy to the terms employed heretofore in the analog computer art. In the reset interval, the positive gating voltage is applied via the forward bus to electronic switch 26 for a sufficient time to insure resetting of its output voltage at terminal 17 to the voltage applied at the memory input terminal 29, e.g., +100 volts. The gating voltage of opposite polarity is applied to unit 13 during the succeeding, longer operate interval. As explained hereafter, application of this control signal, together with the fixed voltage input signals, results in an output wave form of sawtooth configuration, including a ramp increasing from a −100 volts obtained during the reset interval, linearly through the duration of the operate interval to the other limit, e.g., +100 volts. Such repetitive ramp voltage may be representative of an independent variable $x$.

In further accord with the present invention, means are provided for deriving a control signal at an instant of time which may vary within one of the recurrent intervals, preferably the operate interval, for switching one or more memory units between its holding and tracking modes. Preferably, however, such means provides at least two control signals so that the mode switching of successive memory units may be in differently timed relation. To exemplify such means, there is shown in FIG. 1 a voltage comparator 40 having a pair of inputs plus and minus, as well as a pair of outputs illustrated by busses 41 and 42 connecting with terminals "X" and "O." While the voltage comparator 40 may have a variety of forms suitable for practice of the present invention, a preferred form is described hereafter in conjunction with FIG. 3. In summary, however, the comparator may be responsive to the difference between the voltages applied at the plus and minus input terminals (with respect to ground) to provide a plus six volt output at the X terminal when the input voltage applied to the positive terminal is algebraically less than the input voltage applied to the minus terminal, at the same time applying a negative six volt output to the O terminal. Conversely, the instant when the input voltage applied to the plus terminal exceeds that applied to the minus terminal, the output voltage at the X terminal switches to a minus six volts and that at output terminal O switches to a plus six volts. Of course, like the timing waves from square wave generator 14, the output from voltage comparator is of a form, magnitude and polarity adapted for actuation of electronic switch 26. The exemplary voltage is given as applied at the output terminals X and O are seen to correspond with the successive voltages of the timing wave at forward terminal NB and thus, as expected, have a like operative effect upon electronic switch 26.

To exemplify a specific application of the voltage comparator 40, its minus input terminal is connected to a tap of potentiometer 43 across which is applied +100 volts to supply an input voltage of $a+$. The respective output terminal X and O of the comparator are connected by patch board jumpers 44 selectively to the control signal input terminals B of memory units 10 and 11, correspondingly designated "X" and "O."

While the invention may be exemplified by application of a control signal from the comparator to one of the X and O memories 10 and 11, in a practical application of the invention to the evaluation of a definite integral, the memory unit 9 has its control input terminal B connected by patch board jumper 34 to the forward timing wave terminal NB so as to be programmed in synchronism with amplifier unit 13. It may be noted here that memory unit 9 carries no designation in the rectangular portion of the symbol, and this is to differentiate it from the X and O memory units and to indicate that it has a control input connection to the timing wave generator 14 and that any signal applied to its normal input is applied with unity gain. In this case, the normal input terminal is connected to the tap of a potentiometer 46 across which is applied an input voltage representing a function $f(x, y)$ of two variables $x$ and $y$. The memory input terminal, likewise, is connected to the tap of the potentiometer 47, in this case having a reference voltage of +100 volts applied across it to provide an initial condition or lower limit for the integration.

To exemplify typical operation of the appartus of FIG. 1, the input voltage $f(x, y)$ may be assumed to have a value varying continuously or in recurrent intervals at a rate which is slow with respect to the repetitive operation rate established by the square wave generator 14. However, since the repetitive operation rate may be relatively high, for example, between 50 and 1000 c.p.s. and higher, rates input signal variation may be accommodated which have no counterpart in prior art practice.

Beginning with the first reset interval, the memory unit 9 has applied to its control input terminal B a plus six volts from forward timing wave terminal NB, thus completing the second feedback loop via resistor 23, thus placing the memory unit in the reset or tracking mode. At a high speed made possible by the impedance transformation afforded by amplifier 25, the output of memory unit 9 is driven into correspondence with the input voltage applied at its memory input terminal. By adjusting the tap of potentiometer 47 to obtain the attenuation ratio $y_{0/100}$, where $y_0$ is the desired initial condition for the independent variable $y$ and 100 is the excursion limit of the integrator amplifier of memory unit 9, a desired initial condition for the variable $y_0$ is incorporated in the problem solution. Due to the inverting action of the operational amplifier 15, the output during the reset interval is then $-y_0$. It may be noted that the input applied from potentiometer 46 to the normal input terminal has a negligible effect on the initial condition set in the output of the memory unit 9 because the resetting input has such a short time constant relative to the normal input.

At the instant when the voltage on the forward bus changes to a negative polarity to start the operate interval of the first cycle, with switch 26 of memory unit 9 is driven to its OFF condition to open circuit the second feedback loop, effectively decoupling the memory input from the input to the operational amplifier 15. Thereafter, the memory unit 9 operates as a conventional integrator amplifier. The potentiometer 46 by which the applied signal $f(x, y)$ is coupled to the normal input serves to introduce the integration factor $\beta_x$ insuring that the output voltage represents the correct value of the integral for the time scale employed in the repetitive operation. Hence, the output from memory unit 9 is characterized as the negative of the integral of $f(x, y)$ taken with respect to the independent variable $x$ over the limits zero to $x$, i.e., $$-\int_0^x f(x, y)\,dx$$

Such output signal is coupled via jumper 12 to the memory input terminal of the X memory unit 10.

Since the X memory unit 10 has applied to it the control signal from the X terminal of voltage comparator 40, which has a waveform represented in FIG. 2 by curve 51, it will be seen that the memory unit 10 is in the tracking mode during the first reset interval due to application to its control input terminal of a positive six volts. Since the output of the integrator memory unit 9 during such reset interval was $-y_0$, that is, the initial condition on the $y$ variable, the output of X memory unit 10 is the same value but with an inverted polarity during such interval. The X memory unit remains in the tracking mode, as seen from curve 51, until a problem-determined time $t_n$ occurring during the succeeding operate interval. Until such time $t_n$, therefore, the output of X memory unit 10 tracks the output of integrator memory unit 9 and therefore reproduces with a sign inversion the integral of $f(x, y)$ with respect to $x$.

In order to evaluate this integral for a definite value $+a$ of the variable $x$, a voltage equal to the value $+a$ for the upper limit of integration is applied to the minus terminal of voltage comparator 40. So long as this voltage remains greater than the voltage applied to the plus terminal of the comparator, the output of the comparator applied via the X terminal is a plus six volts and therefore maintains the X memory unit 10 in its tracking mode. By then applying the ramp voltage derived from integrator unit 13 to represent the independent variable $x$ during the operate interval, a comparison is obtained at the instant when the input $x$ equals $+a$. At the instant of such comparison, the voltage terminal X switches from positive to negative and thereby gates the switch 26 of X memory unit 10 to its OFF condition. The X memory unit is thereby immediately transformed into its holding mode and holds at its output for the remainder of the operate interval a voltage representing the evaluation of the integral applied at its input determined with the upper limit of integration set at $x=+a$. Since the output of the X memory unit is applied to the memory input of the O memory unit 11, such value of the integral is acquired at the output of the O memory unit immediately following the instant $t_n$ when the voltage at the O terminal of the comparator switches from negative to positive. The voltage derived from the output of O memory unit 11 representing the evaluated definite integral may be supplied to other portions of the analog computer or to suitable indicating or readout apparatus during the remainder of the first operate cycle or, if desired, during the following reset interval when such value is held in memory by the memory unit.

To understand better how the memory units 9, 10 and 11 are conditioned for a subsequent cycle of repetitive operation, it should be noted that integrator unit 13 is programmed in synchronism with integrator unit 9 through successive reset and operate intervals in repetitive cycles. At the beginning of each reset interval, the integrator unit 13 has its output reset to the negative of the voltage applied at memory input terminal 29, namely to —100 volts, representing the negative limit of its full range. With input potentiometer 22 set to provide the same integrating factor $\beta_x$ as input potentiometer 46 for memory unit 9, the output of the integrator unit 13 linearly rises from the —100 volt initial condition at a linear rate representing the variable $x$ as it is utilized by the memory unit 9 in deriving the integral of $f(x, y)$ with respect to $x$. At some time during the sweep of the variable $x$ from —100 volts to +100 volts during each operate interval, its magnitude will exceed the value $+a$ of the upper limit of integration $x=+a$, thereby causing the voltage comparator to reverse the opposing polarities of its output supply to terminals X and O, the voltage at the X terminal becoming negative and that at the O terminal becoming positive. Thereafter the voltage representing the variable $x$ applied to the plus input terminal of the comparator has no further effect until, at the end of the operate interval, the integrator unit 13 is reset by control signals from the forward bus again to the —100 volts. Instantly, the voltage comparator again reverses the polarities of its outputs at terminals X and O, since once again the voltage applied at the plus terminal is less than that applied at the minus terminal. In this manner, then, the X and O memory units 10 and 11 are kept in step with the reset and operate intervals in accordance with which the integrator unit 13 and other memory units such as memory unit 9 in the problem setup are programmed.

In sum, the X memory unit is in the tracking mode during the reset interval and initially in the tracking mode during the operate interval. Upon occurrence of a comparison, the X memory unit switches to the holding mode thus holding at its output a voltage representing the value of the input signal acquired at the instant of comparison. Conversely, the O memory unit is in the holding mode during the reset interval and in the initial portion of the operate interval and is switched at the instant of comparison to the tracking mode. As exemplified in FIG. 2, the instant of comparison may occur at various times in successive cycles but, for many practical applications, has an occurrence confined to one of the intervals, namely, the operate interval.

It may be noted that the X and O memories operate in successive cycles to evaluate the input indefinite integral for the same upper limit $a$ of the desired definite integral. If desired, of course, the upper limit may be varied from cycle to cycle in accordance with any desired time-varying relationship. Where the upper limit is to be of constant value, on the other hand, the constant can be represented in the internal circuitry of the comparator, so that the comparator is then responsive to only a single but time-varying input. It may be observed, of course, that the problem solution represented in FIG. 1 is of a very simple character compared with that to which the practice of the invention may be applied. Other suitable applications can, of course, be made for utilizing the control signal developed from the voltage comparator when there is applied to it a voltage having a predetermined value in the reset intervals and changing monotonically through the operate intervals. While typically a comparison is obtained in each cycle, it is conceivable that the comparator may be employed in problems where no comparison occurs in some cycles.

While not employed in the particular problem set up in FIG. 1, the voltage comparator 40 conveniently is provided with a pair of input switches 55, 56 for selective connection of corresponding inputs to the respective timing wave terminals NB and RM. While the effect of closing switches 55 and 56 will be understood better in connection with the description of the voltage comparator of FIG. 3, it may be said here that the effect is to change the output waves at the X and O terminals to the waveforms shown in FIG. 2 and illustrated respectively by curves 57, 58. When these waveforms are applied to the memory units 10 and 11, they are characterized as extended X ($\overline{X}$) and extended O ($\overline{O}$) memories which, upon a comparison, are switched from one mode (operate or track) to the second during the operate intervals and remain in such mode during the succeeding reset intervals. Otherwise, and as already described, these memory units would be characterized as non-extended memories.

Figure 3:
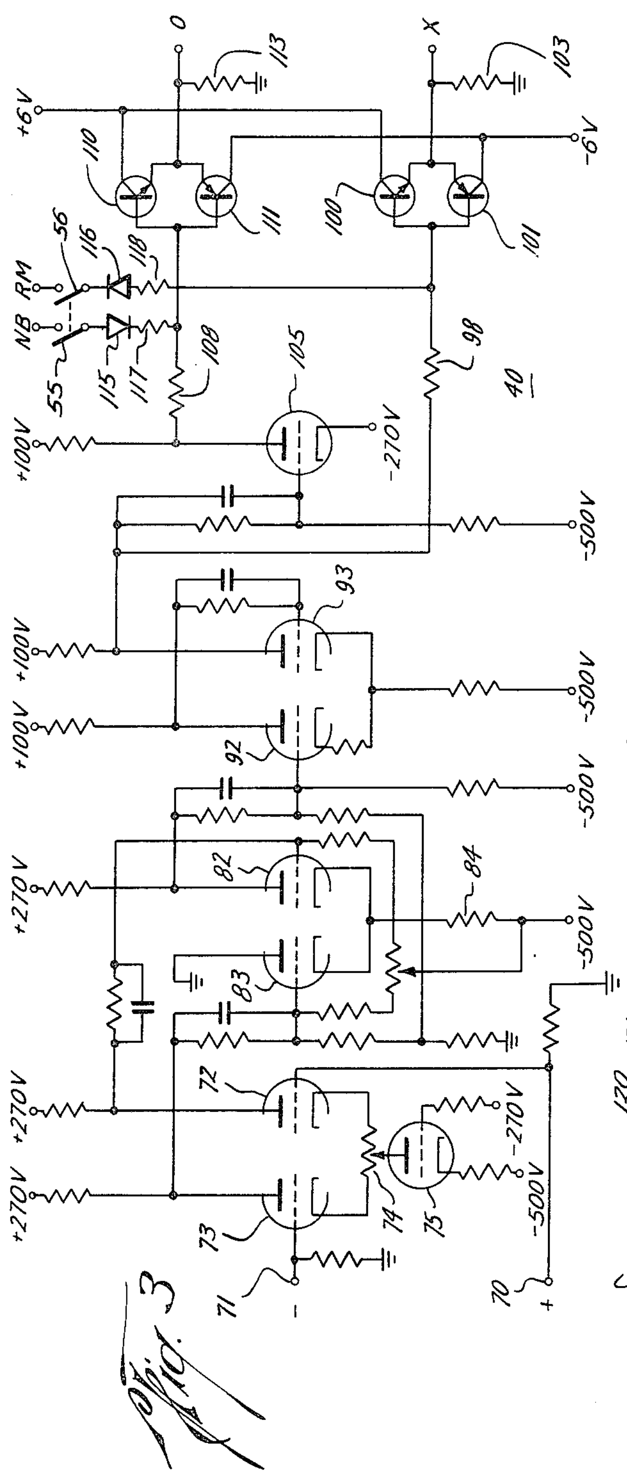
FIG. 3 is a circuit diagram of a voltage comparator suitable for use in the analog computing system of FIG. 1.

Turning now to the voltage comparator of FIG. 3, the exemplary circuit is seen to include plus and minus terminals 70, 71 coupled, if desired, by appropriate grid resistors (not shown) to the respective control grids of triodes 72, 73 having their cathodes connected through balance potentiometer 74 to a source 75 of a low positive bias voltage. The respective outputs of triodes 72 and 73 are separately coupled to grids of triodes 82, 83 having a common cathode connection to cathode resistor 84, the plate of triode 83 being grounded so as to obtain a single-ended output from the plate of triode 82. For further amplification, such output is coupled to the grid of triode 92 the plate of which is in turn coupled to the grid of triode 93.

To obtain the desired output wave form at the X terminal, the output from triode 93 has a common connection via resistor 98 to the bases of transistors 100, 101 which together provide means for selectively switching to the X terminal the plus or negative voltage applied to the terminals across which the transistors are serially connected. Where the desired wave form at the X terminal, is determined from the requirements of the electronic switch 26 (FIG. 1) shifts between plus and minus six volts, substantially the same voltages are applied via such opposite polarity terminals to the collectors of the respective transistors. The common junction of the emitters may be connected directly to the X terminal and via a suitable valued resistor 103 to ground. Since the transistors 100 and 101 are, respectively, an NPN and a PNP type, they serve to apply the positive six volts to the X terminal when their bases are driven positive and, conversely, to apply the minus six volts to the X terminal when their bases are driven negatively by triode 93.

In order that a complementary waveform (curve 52 of FIG. 2) may be obtained at the O terminal, the polarity of the output of triode 93 is coupled to the grid of inverting stage comprising triode 105, the plate of which is in turn coupled via resistor 108 to the common junction of the bases of transistors 110 and 111. Transistors 110 and 111 may be identical to the respective transistors 100 and 101 and have identical connections, including connection of their common emitter junction to the O terminal as well as via resistor 113 to ground.

In operation, so long as the voltage applied at the minus terminal 71 algebraically exceeds the voltage applied to the plus terminal 70, the output from triode 93 is negative and serves to switch the minus six volts to the X terminal. At the same time, the output from inverter stage 105 is positive and serves to switch to the O terminal the positive six volts. A comparison, of course, occurs at the instant when the voltage applied to the plus terminal becomes more positive than that applied to the minus terminal. At such time, the polarity of the outputs from triodes 93 and 105 become, respectively, positive and negative, thus reversing the switching action of the transistors and causing a positive six volts to appear at terminal X and a negative six volts to appear at terminal O. Subsequently, whenever the voltage applied at the plus terminal drops below that applied to the minus terminal, as when the output of the integrator unit 13 is reset to a −100 volts during each reset interval, the polarities at the X and O terminals are switched back again.

For purposes of obtaining extended X and O memories, switches 55 and 56 are closed, so that the timing waves at terminals NB and RM representing the forward and reverse outputs, respectively, of the square wave generator are coupled via oppositely poled diodes 115, 116 and coupling resistors 117, 118 respectively to the common base junctions of the transistor pairs 100, 101 and 110, 111. As may be seen with reference to the curves of FIG. 2, application of a minus six volts at the reverse terminal RM during each reset interval assures a negative voltage output at the X terminal to maintain the X memory unit in its hold condition. Correspondingly, application of a positive six volts at the NB terminal assures a positive six volts at the O terminal, so that the O memory continues in the tracking mode. By suitably proportioning resistors 108, 117 and 93, 118, the voltages applied via the NB and RN terminals, when switches 55 and 56 are closed, are caused to override voltages derived from the amplification stages of the comparator.

Figure 4:
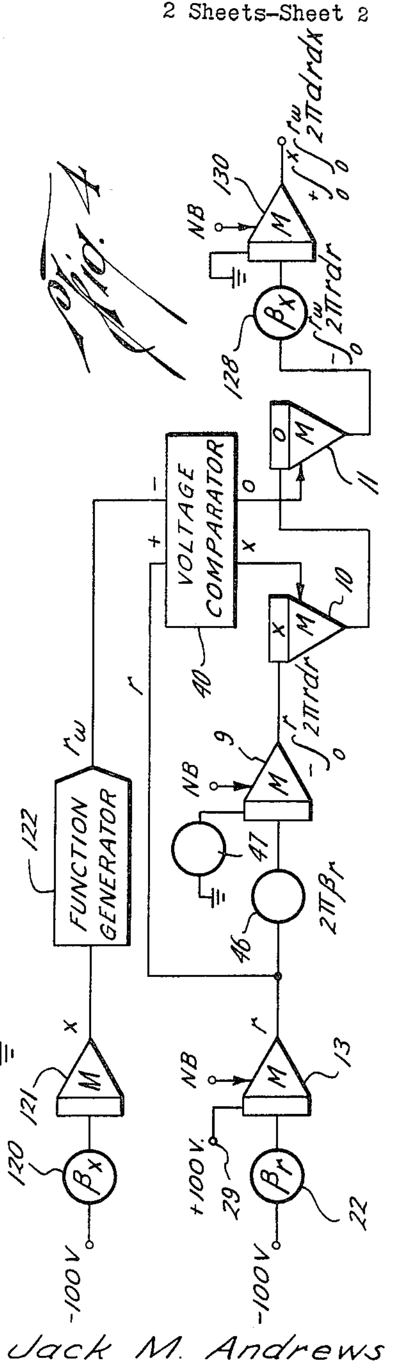
FIG. 4 is a schematic diagram of an analog computing system in accordance with another embodiment of the invention.

Referring now to FIG. 4, the versatility of the present invention is further illustrated in connection with a relatively simple double integration problem. For convenience in illustration, assume that it is desired to determine the volume of a cylinder with a radius $r_w$ at its wall varying with a distance $x$ along its axis as a nonlinear function which may conveniently be represented, for example, in a diode function generator. The problem is then to obtain the double integral with respect to radius $r$ and length $x$. In accordance with the invention, radial integration is performed in the repetitive mode while axial integration is performed in the non-repetitive or real time, mode.

As illustrated diagrammatically in FIG. 4, a voltage representing $x$ is obtained by applying a −100 volts via potentiometer 120 (introducing the integration factor $\beta_x$) to the normal input of a conventional integrator amplifier 121 operating non-repetitively or in real time. The voltage $x$ is, in turn, applied to the input of function generator 122 to provide output voltage $r_w$ in accordance with the functional relationship between the wall radius and the length along the cylinder axis measured from one end. The voltage $r_w$ is applied to the minus input terminal of the voltage comparator 40, the X and O outputs of which are connected to the X and O memory units 10 and 11 in the same manner as in FIG. 1. Thus, arrangement is made for evaluating the integral with respect to radius at the upper limit $r_w$ of integration with the upper limit $r_w$ varying continuously this thus from cycle to cycle of repetitive operation.

To generate a voltage representing the radius $r$, −100 volts is applied via potentiometer 22 (introducing integration factor $\beta_r$) to the normal input of forward memory unit 13 which is thus conditioned for operation in the repetitive mode as an integrator amplifier. During each operate interval, therefore, the output voltage of memory unit 13 increases linearly to provide a representation of the radius $r$ with a range from its lower limit of integration (zero) to the upper limit $r_w$. The voltage $r$ is applied to the plus input terminal of the voltage comparator so that a comparison is obtained when the radius $r$ has a value equal to the limit $r_w$, both voltages applied to the comparator being positive.

The voltage $r$ is also applied via potentiometer 46, introducing the factor $2\pi\beta_r$, to the normal input of a second forward memory unit 9 operating as an integrator amplifier in the repetitive mode. During the operate intervals, then, the output of memory unit 9 equals $$-\int_0^r 2\pi r dr$$

that is, the indefinite integral with respect to $r$. Such output is applied to the memory input of the X memory unit 10 to obtain an evaluated output representing the definite integral, in the same manner as described in conjunction with FIG. 1. The output of O memory unit 11 is then applied via potentiometer 128 set at the integrating factor $\beta_x$ to the normal input of a third forward memory unit 130, to provide at its output the desired double integral solution. It may be noted that the output obtained from the last memory unit 130 during operate intervals of successive repetitive operation cycles lags one cycle behind the output of the preceding forward memory unit 9, the memory capabilities of the X and O memory units providing the necessary accurate storage of voltages from one cycle to the next, as well as the required high speed acquisition of the correct value of the integral evaluated at the upper limit $r_w$ of integration.

While the invention has been exemplied by an uninterrupted sequence of reset and operate intervals differing by one or two orders of magnitude, the relative duration of the reset interval may be lengthened or preferably shortened, and provision may be made for desired overlap or underlap of the respective intervals, as may best suit the particular memory units or applications at hand. Furthermore, while the exemplary embodiments are characterized by repetitive operation of fixed iterative or cyclic rate, such as would generally be of practical utility, the invention is not necessarily restricted in this respect but contemplates the timing wave available in common to a plurality of operational amplifiers programmed for repetitive operation or, if desired, a plurality of timing waves of different frequency or other characteristics for respective ones or groups of such amplifiers. Of course, more than one X and O memory or sets of X and O memories may be subject to the control signals from a single voltage comparator.

In some instances, it may be desirable to accomplish high speed switching within the computer problem setup at the instant of a voltage comparison. A voltage comparator having a signal applied to one of its input terminals of the type provided by amplifier unit 13 may control the electronic switch of a similar amplifier unit through connection of its control input to either the X or O comparator terminal, where such amplifier unit differs in the omission of the integrating capacitor. With this modification, the output of the modified amplifier unit can be switched with high rapidity and accuracy from a voltage corresponding to the normal input to a voltage corresponding to the input applied to the reset or memory input terminal at the instant a comparison is effected.

With regard to the circuitry of the memory units, high speed or electronic switching may be accomplished outside, as well as inside the computing amplifier feedback loop. The switches may be adapted for actuation by any type of waveform, e.g., pulse, sinusoidal, sawtooth, stepped, etc. However, for precise timing, sharp leading and trailing edges corresponding to the reset and operate intervals are desirable.

By suitable switch arrangements, a single or common timing wave may be operative to transfer the switch of one memory unit from the tracking to the hold mode and the differently conditioned switch of another memory unit from the hold to the tracking mode. For example, such switches may have a selectively operable sign inverting input stage by which the memory units may be conditioned as forward or reverse, or X or O. In addition, the switches may incorporate delayed opening or closing, as desired.

In some problem setups, different groups of memory units may be programmed at different repetitive operation rates, or some in real time. The speed of capacitor recharging upon switching to the tracking or resetting mode may be increased, if desired, by using as a coupling circuit at the memory input terminal a capacitor in parallel with memory input resistor 28 and having a capacitance substantially equal to the time constant of the reset circuit divided by resistance 28.

The invention is, of course, susceptible to various other modifications and additions. Accordingly, the invention is not intended to be restricted to the embodiments illustrated and described but is of a scope defined in the appended claims.

I claim:

1. An analog computer comprising at least one non-extended memory unit for acquiring and storing a voltage in response to control signals, comparator means responsive to at least one variable signal for supplying said control signals to said memory unit dependent upon the amplitude of said variable signal, and means for periodically changing said variable signal to a reference value to produce a corresponding change in the control signals applied to said memory unit.

2. An analog computer comprising at least one non-extended memory unit for acquiring and storing a voltage in response to control signals, comparator means responsive to at least one variable signal for supplying said control signals to said memory unit dependent upon the amplitude of said variable signal in relation to a first reference value, and means for periodically changing said variable signal to a second reference value different from said first reference value to produce a corresponding change in the control signals applied to said memory unit.

3. An analog computer comprising at least one non-extended memory unit for tracking and storing input signals applied thereto and responsive to a control signal for switching between the tracking and storing modes, comparator means for supplying said control signal to said memory unit, and means for supplying to said comparator means a voltage having a fixed reference value during recurrent first intervals and varying monotinically during second alternate intervals, said comparator means being responsive to said voltage for switching said memory unit from a first of said modes to the second at the initiation of each of said first intervals and from the second of said modes to said first at variable times within said second intervals.

4. An analog computer comprising at least one non-extended memory unit for tracking and storing input signals applied thereto and responsive to a control signal for switching between the tracking and storing modes, comparator means responsive to the polarity of the difference between two voltages applied thereto for supplying said control signal to said memory unit, and means for supplying to said comparator means a first voltage of fixed value and a second voltage having a different fixed value during recurrent first intervals and varying monotonically during second alternate intervals, said comparator means being responsive to said voltages for switching said memory unit from a first of said modes to the second at the initiation of each of said first intervals and from the second of said modes to said first at variable times within said second intervals.

5. An analog computer comprising a plurality of computing units each including an operational amplifier, an integrating capacitor charged thereby to develop an output voltage, and switch means responsive to a control signal for selectively coupling to the input of said operational amplifier a voltage representing the difference between its output and a constant value input signal correspondingly to charge said capacitor, a voltage comparator having one input connected to the output of a first of said computing units for supplying a control signal to a second of said computing units when a prescribed comparison occurs, said first computing unit having a second input signal applied thereto tending to produce an output voltage varying in value as the integral thereof, and means for supplying a control signal to said first computing unit to switch its output periodically to the negative of said constant value during first intervals alternate with second intervals of varying output representing the integral of said second input signal, whereby a prescribed comparison occurs at the initiation of each of said first intervals and at a variable time during said second intervals.

6. An analog computer comprising a plurality of amplifier units each including an operational amplifier, an impedance arranged in a degenerative feedback loop between the output and input of said amplifier, and switch means responsive to a control signal for selectively completing said feedback loop from said impedance to the amplifier input, a voltage comparator having one input connected to the output of a first of said amplifier units for supplying a control signal to a second of said amplifier units when a prescribed comparison occurs, means for supplying a periodic control signal to said first amplifier unit, said first amplifier unit having an integrating capacitor charged thereby as the integral of any input signal applied to said amplifier when said feedback loop is incomplete and charged thereby into correspondence with any input signal applied to the junction of said impedance and said switch means when said feedback loop is completed.

7. An analog computer comprising a plurality of amplifier units each including an operational amplifier, an integrating capacitor charged thereby to develop an output voltage, an impedance arranged in a degenerative feedback loop between the output and input of said amplifier, and switch means responsive to a control signal for selectively completing said feedback loop from said impedance to the amplifier input, a voltage comparator having one input connected to the output of a first of said amplifier units for supplying a control signal to a second of said amplifier units when a prescribed comparison occurs, means for supplying a periodic control signal to said first amplifier unit and to a third amplifier unit, means for applying a voltage representing a range limit of said voltage comparator to the junction of said impedance and said switch means, thereby to apply a range limit voltage to the input of said voltage comparator when said feedback loop is completed, means applying a voltage to the amplifier input of said first amplifier unit so that the voltage applied to the comparator input when said feedback loop is incomplete will vary as a function of the integral of such voltage, means for applying a voltage to the amplifier input of said third amplifier unit to develop at the output thereof a voltage varying as the integral thereof, said second amplifier unit being responsive to said last mentioned voltage selectively to reproduce and store such voltage at its output in accordance with the control signal derived from said comparator.

8. An analog computer as defined in claim 7 wherein said voltage comparator supplies a control signal to a fourth of said amplifier units for completing its feedback loop when the feedback loop of said second amplifier unit is incomplete and vice versa, and means for connecting the output of said second memory unit to the junction of said impedance and said switch means for said fourth memory unit whereby said fourth memory unit reproduces the output voltage stored by said second amplifier unit when the feedback loop of the latter is incomplete and said fourth memory unit stores such output voltage thereafter when its feedback loop is incomplete.

9. An analog computer as defined in claim 8 wherein said means for applying a voltage to the amplifier input of said third amplifier unit is a potentiometer across which is coupled the output voltage of said first amplifier unit, and means for applying to another input of said voltage comparator a voltage varying in accordance with integration limit values of the variable represented by the voltage applied to the other input of said comparator.

References Cited by the Examiner

UNITED STATES PATENTS

| | | | |
|---|---|---|---|
| 2,891,725 | 6/1959 | Blumenthal et al. | 235—183 |
| 2,967,018 | 1/1961 | Fogarty | 235—194 |
| 3,002,690 | 10/1961 | Meyer | 235—183 |
| 3,008,094 | 11/1961 | Trimmer | 235—183 X |
| 3,016,197 | 1/1962 | Newbold | 235—197 X |
| 3,050,673 | 8/1962 | Widmer. | |

OTHER REFERENCES

Instruments and Control Systems, 2–1960, page 289.

Andrews: "The Dynamic Storage Analog Computer—DYSTAC," Instruments and Control Systems, 9–1960, pages 1540–1544.

Gilliland et al.: "Use of Analog Memory for Simulation of a Melting Slab," Instruments and Control Systems, 9–1960, pages 1545–1549.

MALCOLM A. MORRISON, *Primary Examiner.*

WALTER W. BURNS, Jr., C. L. WHITHAM, K. W. DOBYNS, *Assistant Examiners.*